United States Patent [19]

Endersz

[11] 3,737,777

[45] June 5, 1973

[54] INJECTION PHASE LOCKING DEVICE IN AN FM-TRANSMITTER FOR A SELF-OSCILLATING OSCILLATOR MODULATED BY A MODULATION SIGNAL

[75] Inventor: Gyorgy Geza Endersz, Hagersten, Sweden

[73] Assignee: Telefonaktiebolaget LM Ericsson, Stockholm, Sweden

[22] Filed: July 2, 1971

[21] Appl. No.: 159,327

[30] Foreign Application Priority Data

July 10, 1970 Sweden ........................9580/70

[52] U.S. Cl. ...................325/148, 325/105, 325/126, 325/184, 332/22

[51] Int. Cl. .........H03c 3/02, H04b 1/04, H04b 1/66

[58] Field of Search......................325/184, 145, 146, 325/148, 139, 153, 47, 48, 126, 105; 332/22

[56] References Cited

UNITED STATES PATENTS

| | | | |
|---|---|---|---|
| 2,691,095 | 10/1954 | Bailey | 325/146 |
| 3,118,117 | 1/1964 | King | 325/184 |
| 3,566,269 | 2/1971 | Walker | 325/48 |
| 3,437,958 | 4/1969 | Shaw | 325/148 |
| 3,324,414 | 6/1967 | Numakura | 325/47 |

*Primary Examiner*—Howard W. Britton
*Attorney*—Frederick E. Hane, Charles E. Boxley and Camil P. Spiecens

[57] ABSTRACT

A phase locking arrangement in which a free-running oscillator running with a frequency $f_o$ is injection phase locked by a synchronizing oscillator with a free-running frequency $f_s$ and a multiplier giving a multiplied frequency $n \cdot f_s$. A modulating frequency $f_m$ modulates both the free-running oscillator and the synchronizing oscillator through two direct coupled FM-modulators, so that the free-running oscillator will be continuously tuned to a frequency $f_1$ which is chosen so that the synchronizing band $\Delta f = f_1 - f_o$ of the free-running oscillator is narrow, so that the synchronizing power from the synchronizing oscillator can be kept low.

8 Claims, 6 Drawing Figures

INVENTOR
GYÖRGY GÉZA ENDERSZ
BY Hane, Baxley and Spiecens
ATTORNEYS

INVENTOR
György Géza Endersz
BY Hane, Baxley and Spiecens
ATTORNEYS

INJECTION PHASE LOCKING DEVICE IN AN FM-TRANSMITTER FOR A SELF-OSCILLATING OSCILLATOR MODULATED BY A MODULATION SIGNAL

The present invention relates to an injection phase locking arrangement in an FM-transmitter for a free-running oscillator modulated by a modulating signal. More precisely the arrangement comprises a phase locking arrangement for FM-transmitters within the microwave range, which allows a reduction of the power necessary for the phase locking.

One solution for phase-locking free-running oscillators has previously been described in an article by R. Adler; Proceedings of IRE, June 1946, p. 351–357, according to which a free-running oscillator may be phase locked by means of a controlling signal differing in frequency from the free-running frequency of the oscillator by a value of $\Delta f$, the frequency difference being dependent on the relation between the power of the controlling signal and the oscillator signal.

An object of the present invention is to provide a phase-locking arrangement, particularly for an FM-modulator in microwave FM-systems, using such principle but also causing an increase of the frequency difference with a maintained power synchronization.

The characteristics of the arrangement will appear from the characterizing part of the main claim.

The most important use of the arrangement is for the phase-locking of free-running semi-conductor oscillators within the microwave range, e.g. domain-, LSA and avalanche oscillators, having the most unfavorable noise frequency relation near the carrier frequency (free-running frequency).

The invention will be described in more detail with reference to the accompanying drawings, in which FIG. 1 shows examples of the phase-locking of an oscillator according to the earlier known principle.

which is stated in the above mentioned article by Adler is plotted for different values of the parameter $Q$.

Figure 4:
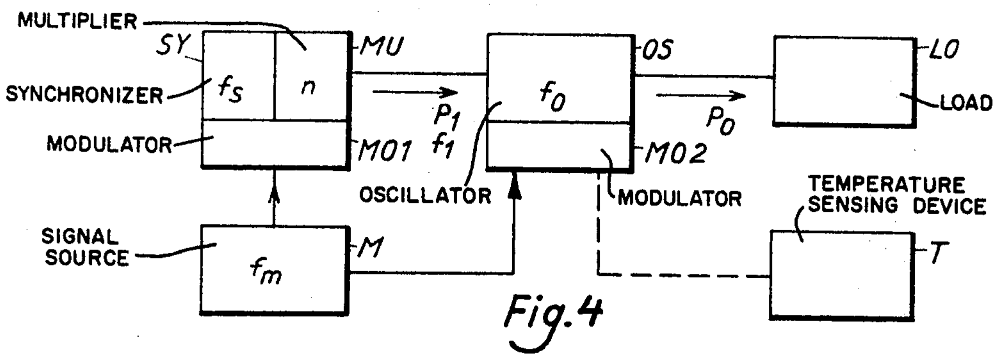

FIG. 4 shows in the form of a block diagram the principle of the invention.

Figure 5:
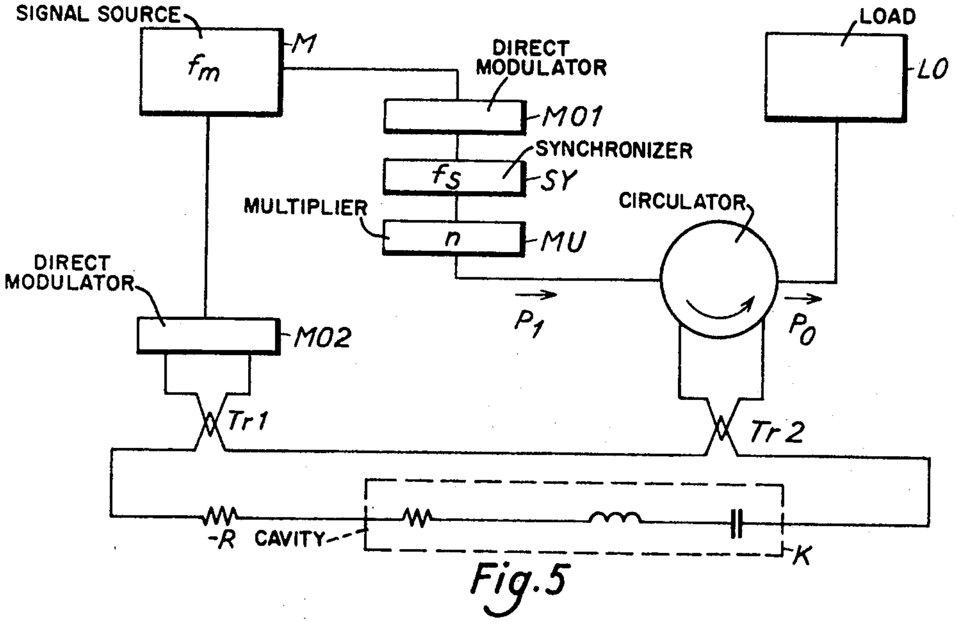

FIG. 5 is a circuit diagram of an embodiment of the invention.

Figure 6:
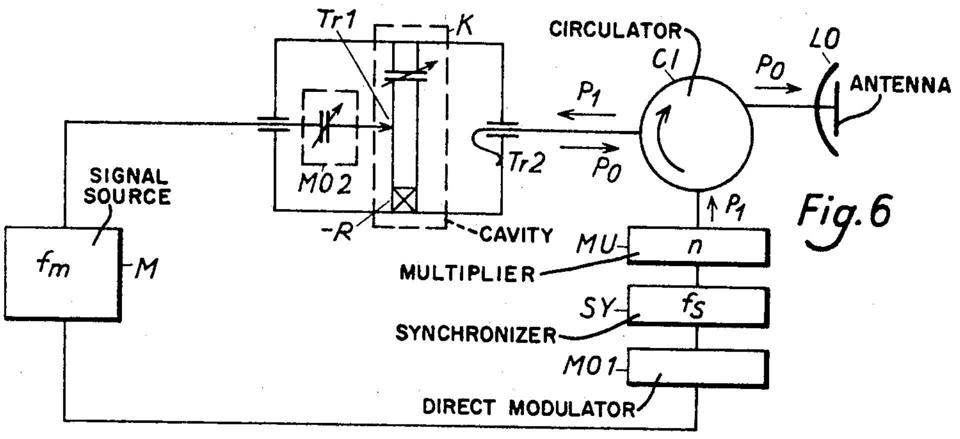

FIG. 6 shows a practical realization of an embodiment according to FIG. 5.

Figure 1:
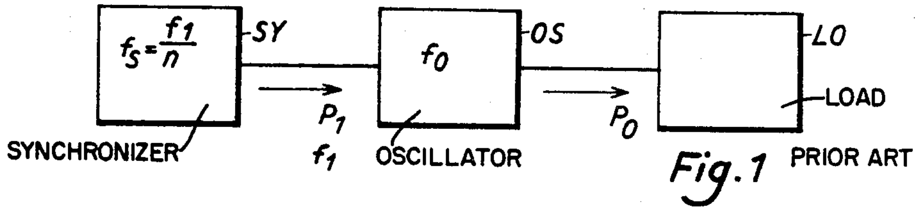
Figures 2, 3:
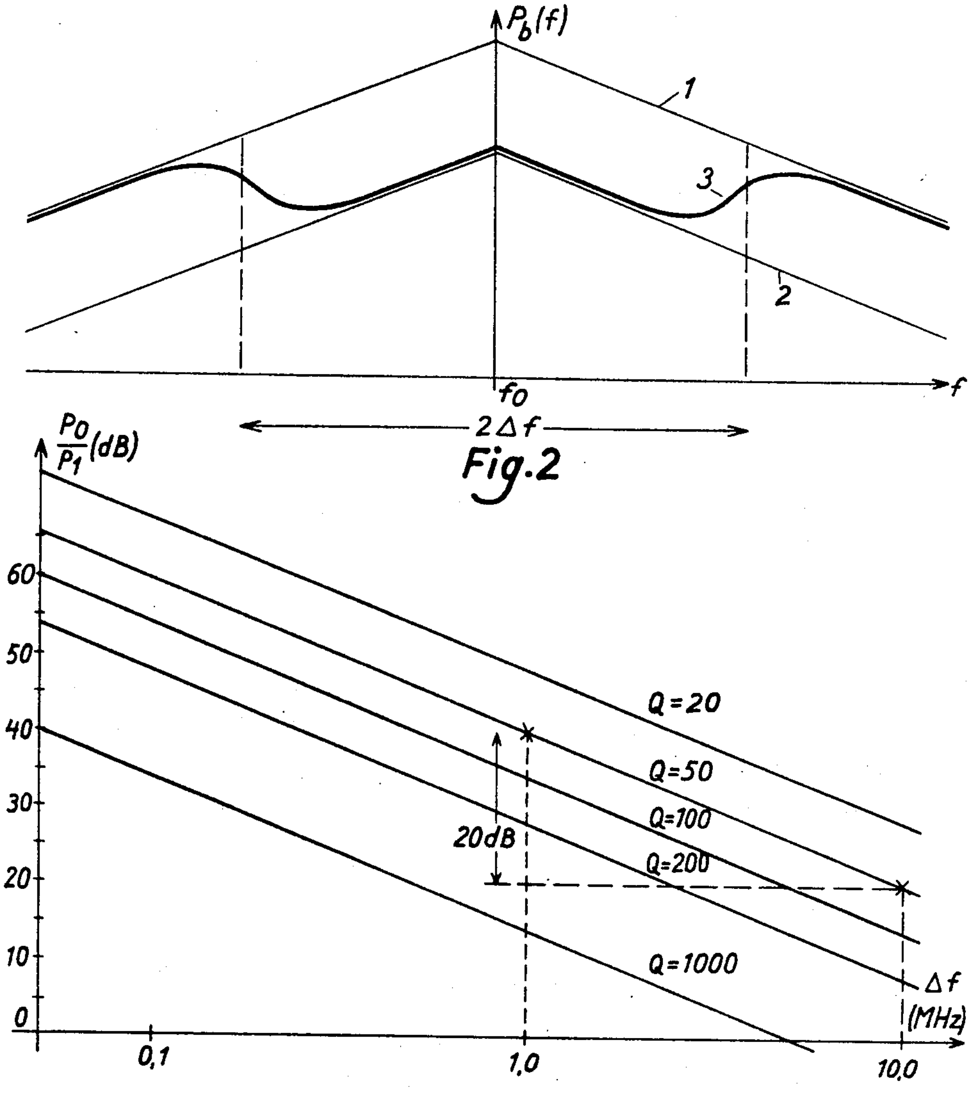
FIG. 2 shows a noise-frequency diagram when phase-locking a free-running oscillator by means of a synchronization signal.
FIG. 3 shows a diagram with a logarithmic scale, in which the graphical representation of the function $$P_o/P_1 = (f_o/2\ \Delta f\ Q)^2$$

The previously known solution for phase-locking a free-running oscillator, described in the article by Adler, PIRE, June 1946, is shown in FIG. 1. The oscillator OS runs with the frequency $f_o$ and supplies a load LO with the power $P_o$. If the long time- or short time stability (frequency noise) is more unfavorable than desired, or if a close phase control of the oscillator frequency is wanted, a synchronizer SY is used, e.g. a crystal oscillator, which is connected to the oscillator OS. The synchronizer SY transmits a signal to the oscillator OS with the frequency $f_1$ and with the power $P_1$. FIG. 2 shows a noise-frequency diagram for a device of the above mentioned type. It has been found that the noise level within a band-width of 2 $\Delta f$ around the free-running frequency $f_o$ of the oscillator is reduced to the noise level of the synchronization oscillator, which may be lower than that of the free-running oscillator, if the synchronization oscillator e.g., consists of a quarts crystal running with a frequency $f_s$. Line 1 then represents the frequency noise characteristic for a free-running oscillator, e.g. a semi-conductor oscillator, line 2 represents the characteristic for a low noiSe synchronization oscillator, e.g., a crystal oscillator the frequency of which is multiplied and the curve 3 represents the characteristic obtained when the free-running oscillator is phase-locked to the synchronization oscillator. It appears from the figure that the semi-conductor oscillator (which gives a considerably higher power than the crystal oscillator) by the phase-locking has obtained the favorable noise qualities of the crystal oscillator within the synchronization band $\Delta f$ around the center frequency $f_o$. Applied to microwave FM-systems the center frequency $f_o$ may be of the magnitude 10 GHz and the frequency $f_s$ in the intermediate frequency range e.g. 100 MHz and therefore it is necessary to make a frequency multiplication by $n$, where $n$ may be an integer chosen in a suitable manner, the result being $f_1 = n \cdot f_s$. The frequency band in which it be desired that the oscillator is synchronized is the so called synchronization band $\Delta f$, which is the difference $(f_o - f_1)$ between the free-running frequency of the oscillator and the frequency of the synchronizer.

According to the above mentioned article there is a definite relation between $P_1/P_o$ and $\Delta f$:

$$P_1/P_o = (2 \cdot (\Delta f/f_o) \cdot Q) \text{ one-half}$$

where $Q$ is the figure of merit of the oscillator. The function:

$P_o/P_1 = (f_o/2\ \Delta f \cdot Q)^2$ is in FIG. 3 plotted for various values of the factor of merit $Q$ of the oscillator.

From the above it is apparent that if the synchronization band $\Delta f$ is increased, also the synchronization power $P_1$ must be increased. If $\Delta f$ is increased, which is the case upon frequency modulation (FM), automatic frequency regulation (AFC) or frequency change of the oscillator, a higher synchronization power $P_1$ is required.

The principle of the invention is shown in FIG. 4. A direct modulator MO1 is connected to the synchronizer SY and a direct modulator MO2 is connected to the oscillator OS. The direct modulators are both controlled by a modulating signal from a signal source M, which generates an output signal with the voltage $U_m$ and the frequency $f_m$. The unit M may e.g., be the transmitter in a radio relay link (e.g. a radio relay link for telephone video bands in a picture telephone apparatus) and the load LO supplied by the oscillator OS may consist of a transmitting antenna. The frequency $f_m$ will modulate the frequency $f_s$ and the frequency $f_o$ and the relation between the voltage $U_m$ and the frequencies $f_s$ and $f_o$ respectively constitutes the modulation characteristic for the modulators MO1 and MO2 respectively. The modulators are in a known manner so arranged and the modulation characteristic so chosen, that the modulator MO1 will modulate the synchronization unit SY within a smaller frequency band (modulation band) than the band within which the modulator MO2 modulates the oscillator OS. The frequency $f_s$ of the synchronizer will e.g., vary ± 50 kHz around its synchronization frequency 100 MHz, while the oscillator OS is modulated within a frequency band of 4.5 MHz around its free-running frequency $f_o$ = 10 GHz. After a frequency multiplication of $n = 100$ by means of a multiplier unit MU, a signal with the frequency $f_1 = n \cdot f_s = 100(100 \pm 0.05) = 10$ GHz ± 5 MHz is supplied to the oscillator OS. As a result the synchronizer SY will modulate the oscillator so that it will be tuned to a frequency $f_1 = n \cdot f_s$ continuously. The synchronization band $\Delta f = (f_o - n \cdot f_s)$ will consequently be kept narrow all the time. It will then be possible to keep the synchronization power $P_1$ as low as sufficient for suppressing the frequency noise of the oscillator near the frequency $f_o$ (compare FIG. 2). The synchronization power $P_1$ may be reduced so much that it corresponds to the characteristic of the modulator MO1 and by for example about 20 dB in ordinary microwave FM-systems. This can be understood from FIG. 3. Without the modulator MO2 the frequency difference form the multiplier will be 10 GHz ± 5 MHz, i.e., a synchronization band of about 10 MHz is required. If, however, the oscillator OS is modulated, its free-running frequency $f_o$ will be displaced 4.5 MHz at a maximum frequency difference (= 5 MHz), the result being that in this case a synchronization band of only 1 MHz will be required. If the Q-value of the oscillator is 50 (a common value in this connection) it can immediately be seen from FIG. 3 that the value of $P_o/P_1$ is increased by 20 dB or, vice versa, that $P_1/P_o$ is reduced by 20 dB. $P_o$ being the constant output power from the oscillator there will be a reduction in $P_1$ of 20 dB. By connecting a temperature sensing device T to the modulator MO2, a simple compensation of the temperature drift of the oscillator is also made possible.

Instead of using a multiplier a mixer stage could be used. As known, this mixer stage consists of a frequency mixer and a local oscillator. The two FM-modulators MO1 and MO2 are in this case arranged so that they have the same modulation characteristic.

FIG. 5 shows a circuit diagram of the connection of the oscillator to the other units through high frequency transformers Tr1, Tr 2. The oscillator is built up as a series connection of a negative impedance element –R in series with a resonant cavity K. A varactor diode or a YIG-resonator connected to the oscillator cavity via a high frequency transformer Tr1 can be used as direct modulator MO2. The modulator MO1, the synchronizer SY and the multiplier unit MU each consists of known circuits within the intermediate frequency range and therefore their construction will not be described in detail.

FIG. 6 shows the practical construction of the direct modulator MO2 and the oscillator OS. The impedance –R in FIG. 4 consists in this case of a Gunn-diode, connected, in a manner known per se, to the oscillator cavity (see e.g. the Swedish publication "Elteknik," January 1968, page 4). The modulator MO2 consists of a varactor diode connected to the oscillator through a transformer Tr1. From the oscillator, the power $P_o$ is, via another transformer Tr2, supplied to the circulator CI at the same time as the power $P_1$, from the modulator MO1 and the multiplier MU is, via the circulator CI, supplied to the oscillator. The load LO in this case consists of a transmitting antenna. The free-running frequency $f_o$ of the oscillator is of the magnitude 10 GHz. As appears from FIG. 2 the frequency noise of the output signal within the synchronization band $\Delta f$ is determined by the noise qualities of the synchronization signal. Outside of the synchronization band the noise level is higher, depending on the noise from the feedback loop of the oscillator and the multiplier, and here the noise qualities are determined by the cavity oscillator itself. The noise spectrum of the free-running Gunn oscillator is reduced by about 9 dB/octave from the free-running frequency $f_o$, while for ordinary negative resistance oscillators the value is about 6dB/octave.

The principle of the present invention may be used in all kinds of oscillator transmitters for communication systems and is no restricted to the disclosed examples.

I claim:

1. An FM-transmitter comprising a modulating signal source, a synchronization oscillator, a frequency changing means for changing the frequency of the signal from said synchronization oscillator, a free-running oscillator, means for connecting said frequency changing means to said free-running oscillator so that the signal generated by said free-running oscillator is phase-locked to the signal generated by said synchronization oscillator, a modulating signal source for generating a modulating signal, a first FM-modulator means connected to said modulating signal source for frequency modulating the signal generated by said synchronization oscillator in accordance with the values of the modulating signal, a second FM-modulator means connected to said modulating signal source for frequency modulating the phase-locked signal generated by said free-running oscillator in accordance with the values of the modulating signal, and a load means connected to said free-running oscillator for receiving the modulated and phase-locked signal from said free-running oscillator.

2. The FM-transmitter of claim 1 wherein said frequency changing means is a frequency multiplier.

3. The FM-transmitter of claim 6 wherein the modulation characteristics of said FM-modulator means are chosen with respect to each other so that the modulation bandwidth of said first FM-modulator means is less than the modulation bandwidth of said second FM-modulator means.

4. The FM-transmitter of claim 1 further comprising a temperature sensitive means connected to said second FM-modulator means for compensating any temperature sensitive frequency drift of said free-running oscillator.

5. The FM-transmitter of claim 1 wherein said frequency changing means comprises a mixer driven by a local oscillator.

6. The FM-transmitter of claim 5 wherein said FM-modulator means have the same modulation characteristics.

7. The FM-transmitter of claim 1 wherein said free-running oscillator comprises a resonant cavity and a Gunndiode connected within said cavity.

8. The FM-transmitter of claim 7 wherein said second FM-modulator means comprises a varactor diode.

* * * * *